United States Patent [19]

Ngo

[11] Patent Number: 4,707,099
[45] Date of Patent: Nov. 17, 1987

[54] LATCH MECHANISM FOR CAMERA SHUTTER

[75] Inventor: Giang T. Ngo, Hilton, N.Y.
[73] Assignee: Eastman Kodak Company, Rochester, N.Y.
[21] Appl. No.: 932,424
[22] Filed: Nov. 19, 1986
[51] Int. Cl.⁴ .............................................. G03B 9/10
[52] U.S. Cl. ................................................... 354/251
[58] Field of Search ............... 354/234.1, 250, 251, 354/261, 264, 266

[56] References Cited

U.S. PATENT DOCUMENTS

| | | | |
|---|---|---|---|
| 3,618,501 | 11/1971 | Bellows | 354/234.1 |
| 3,661,066 | 5/1972 | Ettischer et al. | 354/234.1 |
| 3,718,079 | 2/1973 | Fuller | 354/251 X |
| 3,903,538 | 9/1975 | Yoshizaki | 354/234 |
| 3,938,168 | 2/1976 | Lange | 354/247 |
| 4,145,132 | 3/1979 | Onada et al. | 354/249 |

*Primary Examiner*—Donald A. Griffin
*Attorney, Agent, or Firm*—Roger A. Fields

[57] ABSTRACT

When a toggle-like latch is pivoted to release a shutter opening blade for movement from its cocked position to open the camera shutter, a resiliently flexible member of the latch engages a shutter closing blade to retain the closing blade in its cocked position. A camming surface is arranged on the opening blade to bend the flexible member out of engagement with the closing blade to release the closing blade for movement to close the camera shutter. The camming surface bends the flexible member to release the closing blade as the opening blade is moved to at least partially open the camera shutter.

2 Claims, 8 Drawing Figures

LATCH MECHANISM FOR CAMERA SHUTTER

BACKGROUND OF THE INVENTION

1. Field of the Invention

The invention generally relates to the field of photographic camera shutters. More particularly, the invention relates to a camera shutter of the type wherein a latch for arresting shutter opening and closing blades in respective cocked positions is operated to release the blades in succession to open and close the shutter.

2. Description of the Prior Art

FIGS. 1-4 of the accompanying drawings illustrate a prior art example of a camera shutter of the type wherein (a) shutter opening and closing blades 1 and 3 are urged by respective springs 5 and 7 to pivot from cocked positions in FIG. 1 to uncover an objective lens 9 in FIG. 3 and to recover the lens in FIG. 4 and (b) a latch 11 is pivoted initially by a manually operated shutter release member from a first or original position in FIG. 1 for arresting the opening and closing blades in their cocked positions, to a second position in FIG. 2 for releasing the opening blade, and to a third position in FIG. 3 for releasing the closing blade. When the latch 11 is pivoted from its first position to its second position, a blade engaging member 13 of the latch clears a relatively shallow notch 15 in the opening blade 1 to release the opening blade. See FIG. 2. However, the blade engaging member 13 does not clear a deeper notch 17 in the closing blade 3 and, therefore, retains the closing blade in its cocked position. The opening blade 1 includes a trailing cam edge portion 19 which forces the blade engaging member 13 out of the deeper notch 17 in the closing blade 3, to release the closing blade, as the opening blade is pivoted to uncover the objective lens 9. See FIG. 3. Thus, the opening and closing blades 1 and 3 are released by the latch 11 in succession to uncover and recover the objective lens 9.

Although a camera shutter of the type illustrated in FIGS. 1-4 of the accompanying drawings is known to perform in a satisfactory manner, it may be possible in a particular instance for the latch 11 to be moved from its first or original position immediately to its third position, thereby releasing the closing blade 3 too soon after the opening blade 1 is released.

SUMMARY OF THE INVENTION

The invention solves the above-described problem involving a prior art camera shutter by preventing the possibility of a premature release of the shutter closing blade after the shutter opening blade is released.

According to the invention, there is provided an improved camera shutter of the type wherein (a) a shutter opening blade is urged to move from a cocked position to open the camera shutter, (b) a shutter closing blade is urged to move from a cocked position to close the camera shutter, and (c) latching means for arresting the shutter opening and closing blades in their cocked positions is operated to release the opening and closing blades in succession to open and close the camera shutter. When the latching means is operated to release the opening blade, a resiliently flexible member of the latching means engages the closing blade to retain the closing blade in its cocked position. Actuating means, preferably a camming surface, is arranged on the opening blade to bend the flexible member out of engagement with the closing blade to release the closing blade, to close the camera shutter, as the opening blade is moved to at least partially open the camera shutter. Thus, the flexible member serves to prevent the possibility of a premature release of the closing blade as in the previous example of the prior art.

BRIEF DESCRIPTION OF THE DRAWINGS

The invention will be described in connection with the drawings, wherein.

DESCRIPTION OF THE PREFERRED EMBODIMENT

The invention is disclosed as being embodied preferably in a 35 mm still camera. Because the features of such a camera are generally well known, the description which follows is directed in particular to photographic elements forming part of or cooperating directly with the disclosed embodiment. it is understood, however, that other elements not specifically shown or described may take various forms known to persons of ordinary skill in the art.

Figure 1:
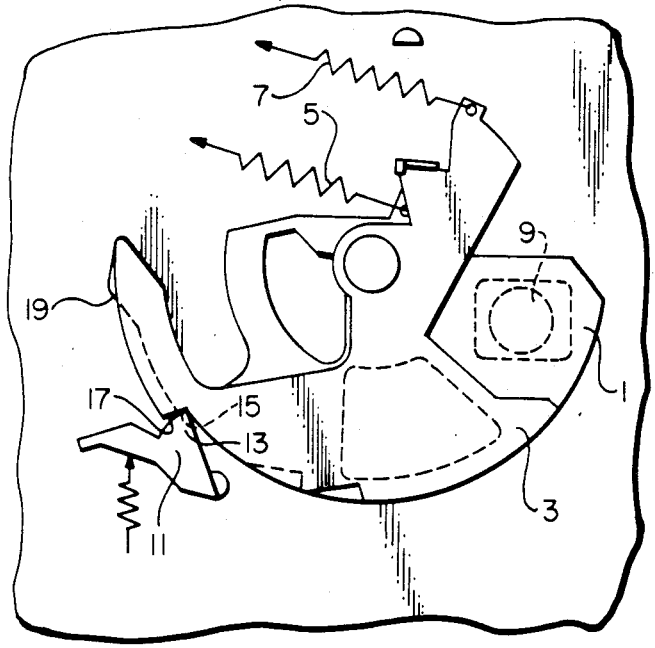
FIG. 1 is a plan view of a prior art camera shutter, showing a shutter opening blade in a cocked position and a shutter closing blade in a cocked position.
Figure 2:
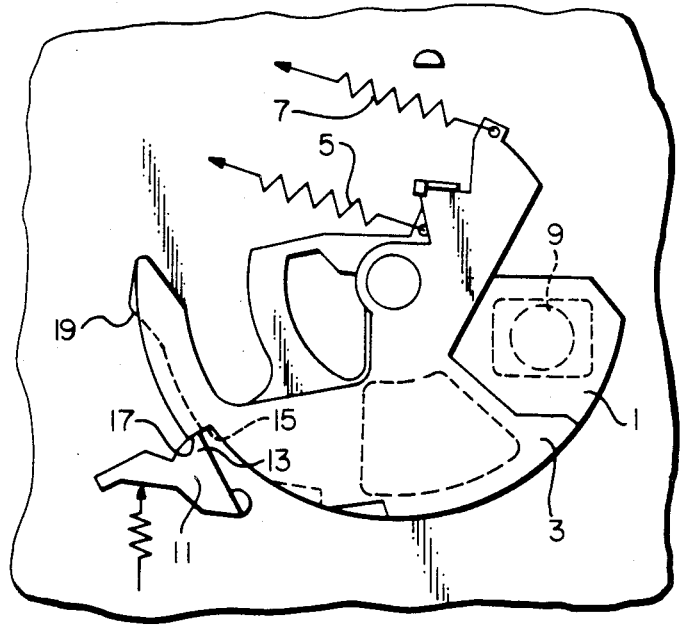
FIG. 2 is a plan view of the prior art camera shutter, showing a latch pivoted to release the opening blade.
Figure 3:
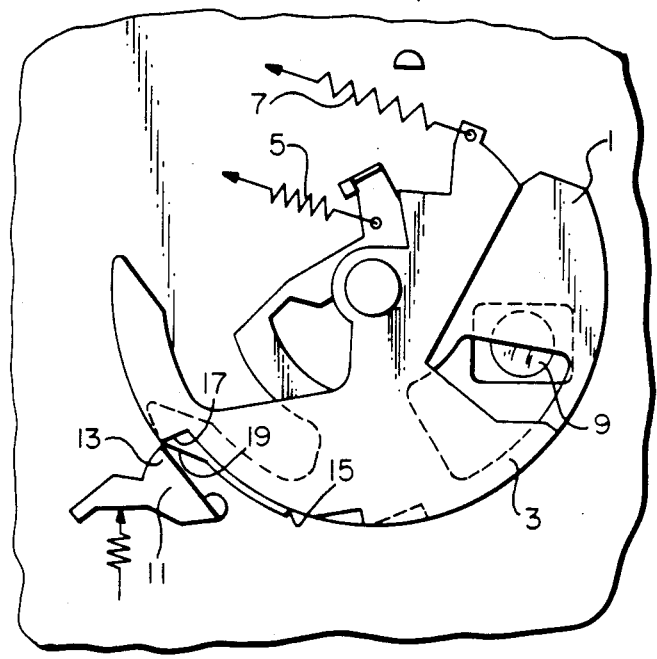
FIG. 3 is a plan view of the prior art camera shutter, showing the latch pivoted to release the closing blade.
Figure 4:
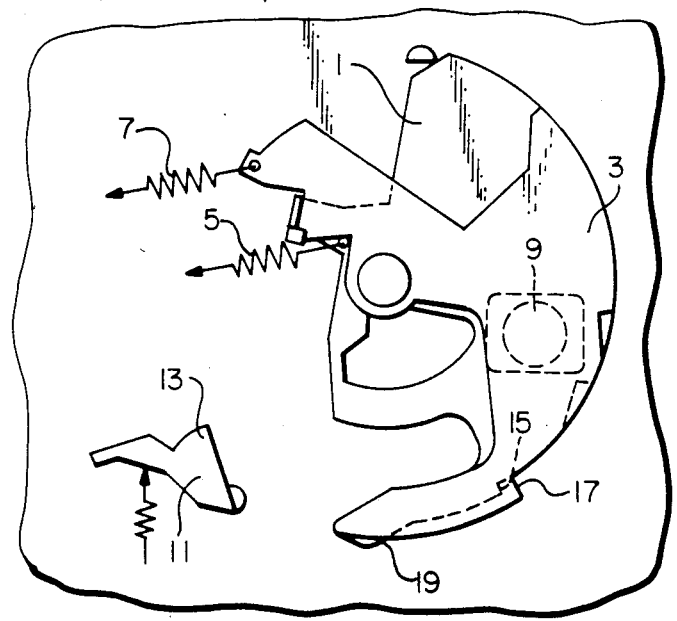
FIG. 4 is a plan view of the prior art camera shutter, showing the opening and closing blades in final positions.
Figure 5:
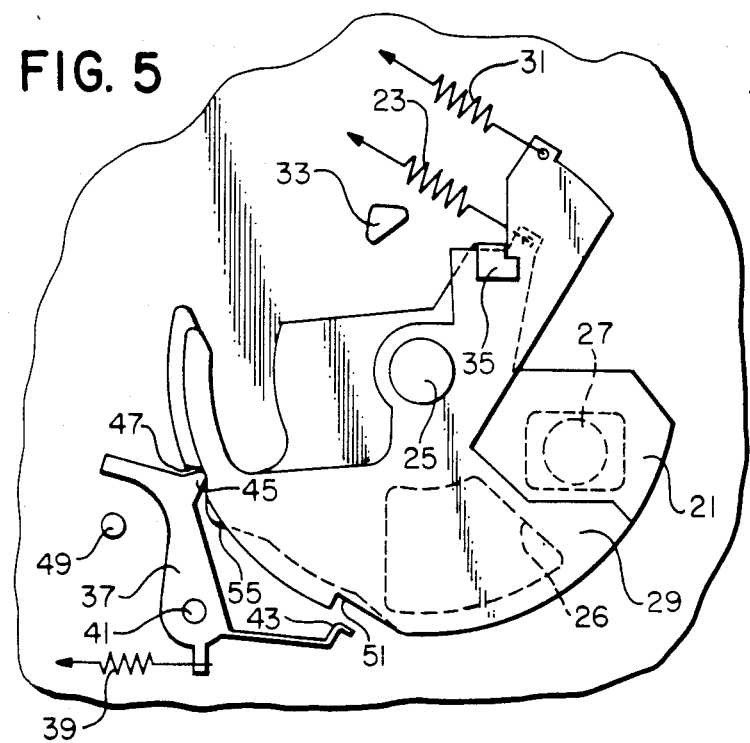
FIG. 5 is a plan view of an improved camera shutter in accordance with a preferred embodiment of the invention, showing shutter opening and closing blades in cocked positions.
Figure 7:
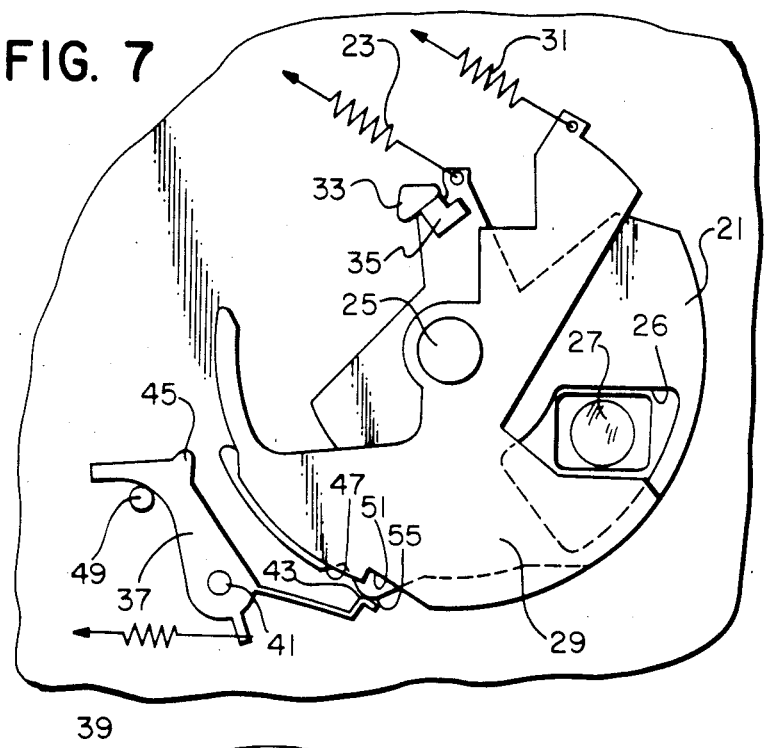
FIG. 7 is a plan view of the improved camera shutter, showing a flexible member of the latch moved to release the closing blade.
Figure 8:
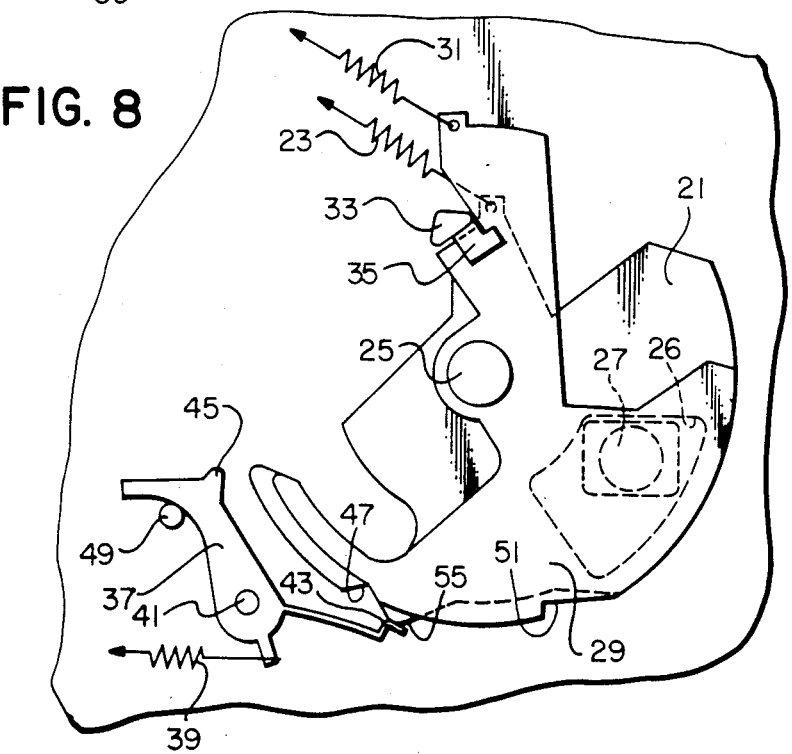
FIG. 8 is a plan view of the improved camera shutter, showing the opening and closing blades in final positions.

Referring now to the drawings and in particular to FIG. 5, there is illustrated a camera shutter in which a shutter opening blade 21 is urged by a schematically shown spring 23 to pivot from a cocked position in a counter-clockwise direction about a pivot pin 25 to open the camera shutter. The camera shutter is opened when an aperture 26 in the opening blade 21 moves across an objective lens 27 to uncover the lens. See FIG. 7. A shutter closing blade 29 is urged by a shcematically shown spring 31 to pivot from a cocked position in the counter-clockwise direction about the pivot pin 25 to close the camera shutter by recovering the objective lens 27. The opening and closing blades 21 and 29 come to rest in terminal or final positions, as shown in FIG. 8, with the opening blade stopped by a fixed stop 33 and with the closing blade stopped by a resetting tab 35 on the opening blade.

As shown in FIG. 5, a toggle latch 37 is urged by a schematically shown spring 39 to pivot in a clockwise direction about a pivot pin 41 to a first or latching position in which a resiliently flexible member 43 of the latch is spaced slightly from the closing blade 29 in its cocked position and a rigid tongue 45 of the latch engages the opening blade 21 in its cocked position to arrest the two blades in their cocked positions. In the preferred embodiment, the rigid tongue 45 engages the opening blade 21 at a notch 47 in the opening blade to hold the opening blade in its cocked position, and the resetting tab 35 on the opening blade engages the closing blade 29 to hold the closing blade in its cocked position. Alternately, however, the rigid tongue 45 can be used to engage the closing blade 29 commensurate with its engagement of the opening blade 21.

Figure 6:
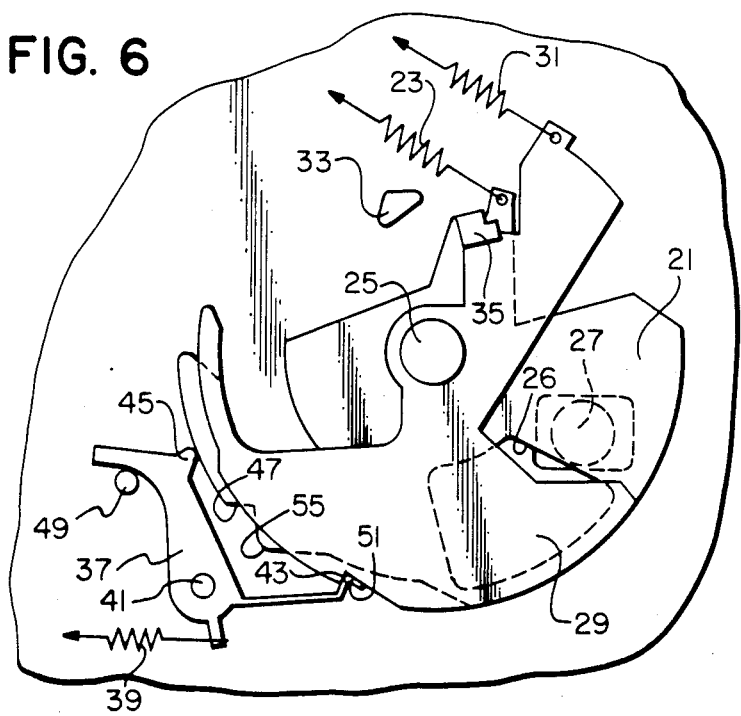
FIG. 6 is a plan view of the improved camera shutter, showing a latch pivoted to release the opening blade.

When the toggle latch 37 is pivoted in a counter-clockwise direction about the pivot pin 47 to a releasing position against a fixed stop 49, as shown in FIG. 6, by conventional means (not shown) operated in response to the camera user depressing a shutter release button, the flexible member 43 is moved into engagement with the closing blade 29 at a notch 51 in the closing blade to retain the closing blade in its cocked position. Also, the rigid tongue 45 is moved out of the notch 47 in the opening blade 21 to a location spaced slightly from the opening blade to release the opening blade. The opening blade 21 then is urged by the spring 23 to pivot in a counter-clockwise direction about the pivot pin 25 to uncover the objective lens 27 as the aperture 26 in the opening blade moves across the lens. See FIG. 7. Shortly before the opening blade 21 comes to rest in its final position against the fixed stop 33, a camming edge 55 of the opening blade moves into the notch 51 in the closing blade 29 to bend the flexible element 43 out of the notch and to a location spaced slightly from the closing blade, as shown in FIG. 7. The closing blade 29 then is urged by the spring 31 to pivot in a counter-clockwise direction about the pivot pin 5 to recover the objective lens 27. As shown in FIG. 8, the closing blade 29 comes to rest in its final position against the resetting tab 35 of the opening blade 21.

The invention has been described with reference to a preferred embodiment. However, it will be appreciated that variations and modifications can be effected within the ordinary skill in the art without departing from the scope of the invention. For example, the flexible member 43 may be initially positioned in the notch 51 in the closing blade 29 to hold the closing blade in its cocked position when the toggle latch 37 is in its first or latching position.

I claim:

1. An improved camera shutter of the type wherein (a) a shutter opening blade is urged to move from a cocked position to open said camera shutter, (b) a shutter closing blade is urged to move from a cocked position to close said camera shutter, and (c) a latch for retaining said shutter opening and closing blades in their cocked positions releases the blades in succession to open and close said camera shutter, and wherein the improvement comprises:

said latch includes initial latching means for releasably retaining said shutter opening and closing blades in a locked together condition in their cocked positions, prior to release of the opening blade to open said camera shutter, and flexible latching means for releasably retaining the closing blade in its cocked position to prevent closing of the camera shutter, after the opening blade is released; and said shutter opening blade includes camming means for flexing said flexible latching means to release said shutter closing blade to close said camera shutter.

2. The improvement as recited in claim 1, wherein said initial latching means and said flexible latching means are commonly mounted for respective movements to release said shutter opening blade from its cocked position and to retain said shutter closing blade in its cocked position.

* * * * *